(12) United States Patent
De Vos et al.

(10) Patent No.: US 11,277,018 B2
(45) Date of Patent: Mar. 15, 2022

(54) POWER MANAGEMENT INTEGRATED CIRCUIT FOR ENERGY HARVESTING WITH PRIMARY BATTERY INPUT

(71) Applicant: E-PEAS S.A., Mont-Saint-Guibert (BE)

(72) Inventors: Julien De Vos, Mont-Saint-Guibert (BE); Geoffroy Gosset, Mont-Saint-Guibert (BE); Cedric Hocquet, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 182 days.

(21) Appl. No.: 16/625,007

(22) PCT Filed: Jun. 21, 2018

(86) PCT No.: PCT/EP2018/066651
§ 371 (c)(1),
(2) Date: Dec. 20, 2019

(87) PCT Pub. No.: WO2018/234496
PCT Pub. Date: Dec. 27, 2018

(65) Prior Publication Data
US 2020/0144839 A1 May 7, 2020

(30) Foreign Application Priority Data
Jun. 22, 2017 (EP) .................................... 17177478

(51) Int. Cl.
*H02J 7/00* (2006.01)
(52) U.S. Cl.
CPC .......... *H02J 7/0047* (2013.01); *H02J 7/0024* (2013.01)

(58) Field of Classification Search
CPC ..................................................... H02J 7/0047
(Continued)

(56) References Cited

U.S. PATENT DOCUMENTS 5,387,858 A * 2/1995 Bender .................. H02J 9/061
320/101
5,610,496 A 3/1997 Hofbauer et al.
(Continued)

FOREIGN PATENT DOCUMENTS

JP 2017147808 A 8/2017

OTHER PUBLICATIONS

Int'l. Search Report for PCT/EP2018/066651, dated Aug. 21, 2018.
Annex to EP Communication issued in corresponding European Patent Appl. No. 18731143.6, dated Dec. 10, 2021.

*Primary Examiner* — Yalkew Fantu
(74) *Attorney, Agent, or Firm* — Blue Filament Law PLLC (57) ABSTRACT

A power management integrated circuit (PMIC) is provided for managing energy from an energy harvester. The PMIC includes a voltage converter and switches configured for switchable connecting an input of the voltage converter with either a first input terminal connectable to the energy harvester or with a second input terminal connectable with a primary battery. The PMIC further includes a controller for driving the switches based on energy status signals related to the energy storage device and/or the energy harvester. The power management integrated circuit (PMIC) is also related to an energy harvesting system that includes a PMIC, an energy harvester connected to the first input terminal, an energy storage device connected to the output terminal, and a primary battery connected to the second input terminal.

19 Claims, 9 Drawing Sheets

(58) Field of Classification Search
USPC .......................................................... 320/107
See application file for complete search history.

(56) References Cited

U.S. PATENT DOCUMENTS

| | | | | |
|---|---|---|---|---|
| 6,225,776 B1* | 5/2001 | Chai | ..................... | H02J 7/0013 |
| | | | | 320/109 |
| 2012/0187897 A1* | 7/2012 | Lenk | ..................... | H01M 10/46 |
| | | | | 320/101 |
| 2013/0313904 A1 | 11/2013 | Kayama | | |
| 2014/0183947 A1* | 7/2014 | Chandler | .............. | H02J 50/001 |
| | | | | 307/23 |
| 2018/0294184 A1 | 10/2016 | Al-Atat et al. | | |
| 2018/0301928 A1 | 10/2018 | Yamamoto et al. | | |

* cited by examiner

POWER MANAGEMENT INTEGRATED CIRCUIT FOR ENERGY HARVESTING WITH PRIMARY BATTERY INPUT

FIELD OF THE INVENTION

The present invention relates to a Power Management Integrated Circuit (PMIC) for managing energy from an energy harvester.

The present invention also relates to an energy harvesting system comprising a PMIC, an energy harvester source and an energy storage device.

The present invention further relates to a method for managing a transfer of electrical power from an energy harvester to an energy storage device using a power management integrated circuit PMIC comprising a voltage converter.

DESCRIPTION OF PRIOR ART

A PMIC for managing energy from an energy harvester is to be understood as a microchip configured for energy management and is known in the art. A PMIC for energy harvesting is for example available from the applicant of the current patent application and known under the reference number AEM10940. Those PMIC's are suitable to handle a typical input power that can vary in the range between 1 microwatts and 1 Watt. In other words, the PMIC has to be construed as a microchip that forms an interface between the energy harvester source, the energy storage device and one or more application circuits.

The PMIC typically comprises an input terminal for making a connection with the energy harvester for receiving an input power and a first output terminal for making a connection with an energy storage device for supplying an output power for charging the energy storage device. The PMIC further comprises at least a second output terminal for providing an output power to at least one application load such as an application circuit or any type of electronic device.

Such known PMIC's comprise a voltage converter that receives the input power from the energy harvester. The voltage converter converts the input power received at an input voltage $V_{in}$ into an output power at an output voltage $V_{out\_VC}$. The voltage converter comprises for example a DC-DC boost converter circuit. A first connecting circuit is provided for transferring the electrical power from the voltage converter to the first PMIC output terminal for charging a storage device connected to the first output terminal. A second connecting circuit is then provided for coupling the second output terminal with the output of the voltage converter and/or with the first output terminal. In this way, the PMIC can supply an output power at its second output terminal to the application load when connected to the second output terminal.

During operation of the PMIC, energy is extracted from the energy harvester source and transferred to the external energy storage device coupled to the first output terminal and/or transferred to the external application circuit coupled to the second output terminal. At moments when the energy harvester is not operating, the energy stored in the energy storage device can be supplied to the at least one application circuit coupled to the at least one second output terminal by transferring charges from the storage device to the second output terminal using the second connecting circuit.

In addition, as known in the art, these PMIC's for managing energy from an energy harvester generally comprise, in addition to the voltage converter, a cold-start module 30 for starting-up the PMIC. The cold-start module typically comprises a charge pump. In contrast to the voltage converter that needs a supply voltage to be able to operate, the cold-start module can be construed as a self-starting module that automatically starts acquiring power from the energy harvester when a minimum input voltage is available at the input of the cold-start module. When the PMIC is powered up, the cold-start module, that generally has a low power transfer efficiency, is disabled and only the voltage converter, generally having a high power transfer efficiency, is enabled for acquiring power from the energy harvester. The PMIC mentioned above with reference AEM10940 comprises for example a cold-start module that starts to operate at an input voltage $V_{in}$ as low as 380 mV and with an input power as low as 3 microwatt.

Examples of energy harvester sources are photovoltaic cells (PV) or thermoelectric generators (TEG). Examples of storage devices are a Li-ion battery, a thin film battery or a super or a conventional capacitor.

The energy storage device is a necessary device of the PMIC because of the unpredictable nature of ambient energy harvesters for supplying energy. Another advantage of the storage device is that it allows to provide power peaks to the application circuits.

However, a problem with the current energy harvesting systems using these PMIC's is that it is difficult to guarantee that when the storage device is no longer fully charged, the average power provided by the ambient energy harvester source will always be higher than the average power consumed by an application circuit coupled to the at least one second output terminal. This is mainly due to the fact that this not only depends on the size of the energy harvester source but also on environmental conditions. As a consequence, in certain circumstances, the power supply to the application circuits can be interrupted which is a critical situation for applications where power shortage is of great concern.

Backup systems for PMIC's using primary batteries have been disclosed by for example Analog Devices in the data sheets of the PMIC known under reference ADP5090, "Ultralow Power Boost regulator with MPPT and charge management". These backup systems connect a primary battery to the application circuit when no energy is available from the energy harvester. However, many types of primary batteries and technologies exist and hence a backup system with a primary battery is limited to its specific voltage and hence not all application circuits can be supported. Alternatively, various primary batteries with different specifications need to be used in order to be able to provide a backup power to multiple application circuits having different voltage requirements.

In US2012/0187897, a battery charger integrated circuit is disclosed for charging a rechargeable battery, but no PMIC for managing energy from an energy harvester as discussed above is disclosed. In an exemplary embodiment of US2012/0187897, the battery charger IC comprises a USB external power input that can be used to charge the rechargeable battery instead of using the solar cell. This exemplary embodiment comprises a single input node for receiving input power from a solar cell, but other input sources, including a battery cell, could be connected to the same single input node by externally switching the input source.

SUMMARY OF THE INVENTION

It is an object of the present invention to provide a PMIC for managing energy from an energy harvester that provides an alternative solution for the problem mentioned above where, in certain circumstances, the energy harvester and/or storage device are not capable to supply sufficient energy to an application circuit coupled to the second output terminal. It is a further objective of the present invention to provide a PMIC that automatically maximises a continuous availability of output power at an output terminal of the PMIC.

The present invention is defined in the appended independent claims. Preferred embodiments are defined in the dependent claims.

According to a first aspect of the invention, a Power Management Integrated Circuit (PMIC) for managing energy from an energy harvester is presented.

Such a PMIC comprises a voltage converter for converting an input voltage into an output voltage, a first input terminal connectable with the energy harvester for receiving a first input power, a first conducting path for transferring the first input power from the first input terminal to an input of the voltage converter, a first output terminal connectable with an energy storage device, a first connecting circuit for conductively connecting an output of the voltage converter with the first output terminal, a second output terminal connectable with an application load, and a second connecting circuit configured for coupling the second output terminal with the output of the voltage converter and/or with the first output terminal.

The PMIC according to the invention is characterized in that it comprises a second input terminal connectable with a primary battery for receiving a second input power, a second conducting path for transferring the second input power from the second input terminal to the input of the voltage converter, a first switch S1 configured for enabling or disabling current flow in the first conducting path by respectively closing or opening the first switch S1, a second switch S2 configured for enabling or disabling current flow in the second conducting path by respectively closing or opening the second switch S2, and monitoring means for monitoring for monitoring an Energy Storage Signal (ESS) at the first output terminal and/or for monitoring an Energy Harvesting Signal (EHS) at the first input terminal.

The PMIC according to the invention further comprises, a controller for controlling the first switch S1 and the second switch S2. The controller is coupled with the monitoring means and configured for switching between a normal operating state wherein the first switch S1 is closed and the second switch S2 is open and a primary battery operating state wherein the first switch S1 is open and the second switch S2 is closed, and wherein said switching between said normal operating state and said primary battery operating state is triggered based on said energy storage signal and/or said energy harvesting signal.

Advantageously, by providing monitoring means for monitoring an energy storage signal and/or an energy harvester signal, and by providing a controller for controlling a switching, based on these signals, between a normal operating state where power is received from the energy harvester and a primary battery operating state where power is received from the primary battery, the supply of output power for charging an energy storage device or for supplying output power to an application can be continued or prolonged. Hence, even if the energy harvester is not operational, the PMIC according the invention is configured to continue managing the transfer of electrical power to the energy storage device.

Advantageously, by providing a first conducting path and a second conducting path for conductively connecting the input terminal of the energy harvester and the input terminal of the primary battery with the input of a voltage converter, the voltage regulation by the voltage converter is performed the same way for both the normal operational state and the primary battery operational state such that the output power and output voltage characteristics are not changed when switched to the primary battery.

Advantageously, connecting the primary battery at the input of the voltage converter allows for a broader choice on the primary battery selection than when the primary battery is connected at the output of the voltage converter. The primary battery voltage depends on the type of battery and on the battery technology. Many types of primary batteries and technologies exist. By connecting the primary battery to the input of the voltage converter, the primary battery at the input and the rechargeable battery used as storage device at the output of the voltage converter can have an unrelated voltage level. For example, a primary AAA cell at the input having a typical voltage level of 1.5 V and a rechargeable Li-Ion battery at the output with typical voltage level of 3.7 V can be used. Advantageously, with the PMIC according to the invention, it is possible to select a primary battery with a voltage lower than the load operational voltage.

In preferred embodiments, the power management integrated circuit according to the invention comprising a cold-start module configured for starting-up the power management integrated circuit. In these embodiments, the controller is configured for enabling operation of the cold-start module and disabling operation of the voltage converter if the output voltage $V_{out\_VC}$ at the output of the voltage converter is lower than a minimum operational threshold voltage $V_{out\_VC-min}$. On the other hand, if the output voltage $V_{out\_VC}$ at the output of the voltage converter is equal or above the minimum operational threshold voltage $V_{out\_VC-min}$ then the controller disables operation of the cold-start module and enables operation of the voltage converter.

According to a second aspect of the invention, a method for energy harvesting from an energy harvester is provided as disclosed in the appended claims.

SHORT DESCRIPTION OF THE DRAWINGS

These and further aspects of the invention will be explained in greater detail by way of example and with reference to the accompanying drawings in which.

DETAILED DESCRIPTION OF PREFERRED EMBODIMENTS

Various embodiments of PMIC's for managing energy harvesting from an energy harvester according to the invention are schematically illustrated in FIG. 1*a* to FIG. 5.

The PMIC 1 according to the invention has to be construed as a microchip comprising integrated circuits and a number of input/output pins, also named terminals, connectors or leads. For example, a PMIC can have between 16 and 32 terminals. Generally, the PMIC's have a compact packaging resulting in a square or rectangular footprint with sides having a length between 3 and 5 mm. On the FIGS. 1*a* to 7, the rectangular with a dotted pattern schematically illustrates the footprint of the PMIC packaging and the terminals are schematically indicated with small black rectangles.

As illustrated on the FIGS. 1*a* to 5, a PMIC according to the invention comprises a first input terminal 11 connectable with the energy harvester for receiving a first input power and a first output terminal 16 connectable with the energy storage device for supplying a first output power for charging the energy storage device. A first conducting path 18 is provided for transferring the first input power from the first input terminal 11 to an input of the voltage converter 20. The input of the voltage converter has to be construed as an input node 32 of the voltage converter being at the input voltage $V_{in}$.

The voltage converter 20 is configured for converting an input power at an input voltage $V_{in}$ into an output power at an output voltage $V_{out\_VC}$. A first connecting circuit 27 conductively connects a voltage converter output 40 with the first output terminal 16. In this way, output power can be provided to an external device, such as a storage device 50, coupled to the first output terminal 16. The output 40 of the voltage converter has to be construed as an output node of the voltage converter being at the output voltage $V_{out\_VC}$.

The voltage converter comprises for example a DC-DC boost converter circuit for increasing the input voltage $V_{in}$, or a buck converter circuit for decreasing the input voltage, or a buck-boost converter circuit for both decreasing or increasing the input voltage. These type of voltage converters are known in the art.

Generally, the voltage converter also comprises a power point tracker to define the optimum operational input voltage of the voltage converter in order to extract the maximum power out of the energy harvester.

The voltage $V_{out1}$ at the first PMIC output terminal 16 can be equal or different from the output voltage $V_{out\_VC}$ at the output 40 depending on the type of connecting circuit 27. For example if the first connecting circuit 27 is a conductor or a conducting path, the voltage at the output terminal will be equal to the voltage $V_{out\_VC}$ at the voltage converter output. In other embodiments, the first connecting circuit 27 can comprise an additional voltage converter to regulate an output voltage at the first output terminal 16 or comprise a regulator to regulate the charging of the energy storage device. This can result in a terminal output voltage $V_{out1}$ that is different from the converter output voltage $V_{out\_VC}$.

Figure 1A:
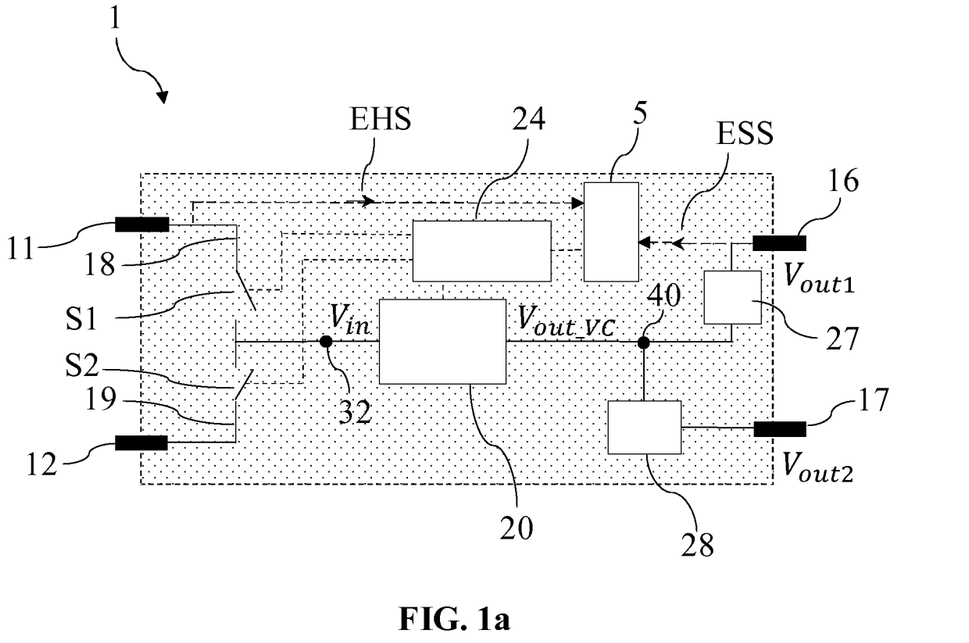
FIG. 1a schematically illustrates a PMIC according to the invention.

As illustrated for example on FIG. 1*a*, the PMIC according to the invention further comprises a second output terminal 17 connectable with an application load and a second connecting circuit 28 configured for coupling the second output terminal with the output 40 of the voltage converter and/or with the first output terminal. The application load is for example an electrical application 70, such as a microcontroller or a radio transceiver. In embodiments, the second connecting circuit 28 comprises a voltage regulator for supplying a voltage $V_{out2}$ at the second output terminal 17. For example, the voltage regulator can be a LDO (Low Drop-Out) regulator for supplying the voltage $V_{out2}$ at the second output terminal 17. In this way, the electrical application that is connected to the second output terminal 17 receives a regulated power at a second output voltage $V_{out2}$.

As known in the art, the first output terminal 16 has to be construed as an input/output terminal in the sense that charges can flow in two directions. Indeed, due to the first connection circuit 27 charges can flow from the voltage converter to the first output terminal 16 during a charging process to charge a storage device connected to the first output terminal and due to the second connecting circuit 28 charges can also flow from the storage device to the second output terminal 17, thereby de-charging the storage device connected to the first input terminal.

Figure 6:
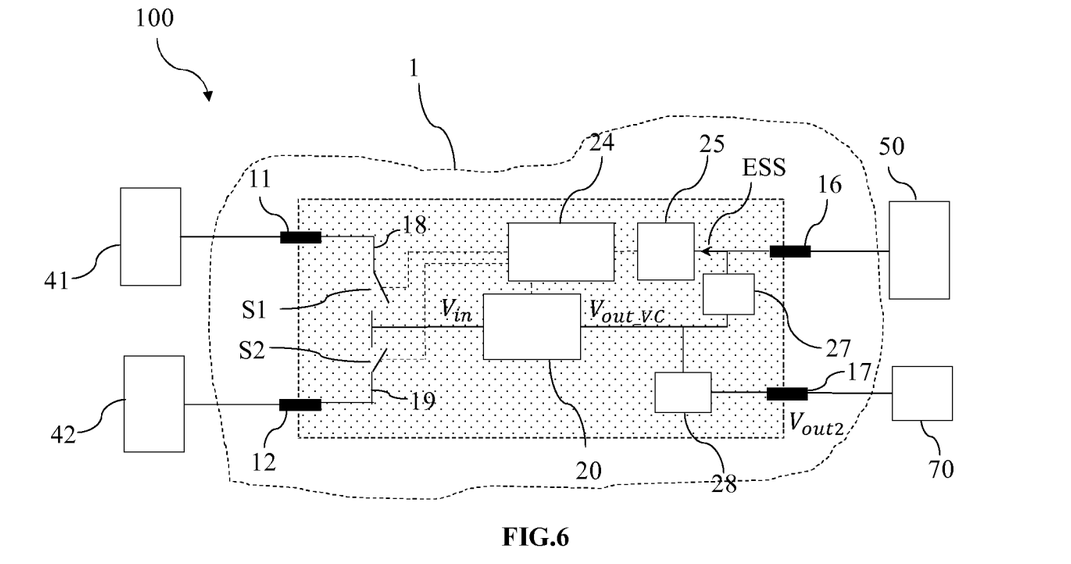

The PMIC according to the invention is characterized in that it comprises a second input terminal 12 for connecting a primary battery for receiving a second input power. This is illustrated in FIG. 6 where a primary battery 42 is connected to the PMIC via the second PMIC input terminal 12. A second conducting path 19 is provided for conductively connecting the second input terminal 12 with the input of the voltage converter 20.

The PMIC further comprises a first switch S1 for opening or closing the first conducting path 18 and a second switch S2 for opening or closing the second conducting path 19. Hence, the switch S1 enables or disables current flow in first conducting path 18 by respectively closing or opening the switch S1. The switch S2 enables or disables current flow in the second conducting path 19 by respectively closing or opening the switch S2. The PMIC further comprises a controller 24 for controlling the first switch S1 and the second switch S2.

The controller 24 is configured for switching between a normal operating state wherein the first switch S1 is closed and the second switch S2 is open and a primary battery operating state wherein the first switch S1 is open and the second switch S2 is closed. In other words, the normal operating state of the PMIC is a state where the energy storage device 50 is charged using power from the energy harvester 41 while the primary battery operating state is a state wherein the energy storage device 50 is charged using power from the primary battery.

The first S1 and second S2 switches have to be construed as electronic switches configured for opening or closing an electrical conducting path or conductor. These switches are for example analogue electronic switches known in the art. These switches make use of for example MOS transistors.

As illustrated on FIG. 1*a*, the PMIC according to the invention further comprises monitoring means 5 for monitoring an energy storage signal ESS at the first output terminal 16 and/or for monitoring an energy harvesting signal EHS at the first input terminal 11.

The controller 24 is coupled with the monitoring means 5 such that the monitoring means is receiving the ESS and/or the EHS signal. These signals can for example be a voltage measured at the first output terminal or a voltage measured at the first input terminal. The monitoring means 5 comprises a signal comparator for comparing the energy storage signal ESS and/or the energy harvesting signal EHS with predefined threshold values. The signal comparator can either be an analogue signal comparator or a digital signal comparator, known in the art. A comparator can be based on an operational amplifier. For embodiments wherein a digital signal comparator is used, the generally analogue signals ESS and EHS are first digitized using an ADC (analog to digital converter). The predefined threshold values can be values locally memorized by the controller, or the predefined threshold values can be generated by a reference voltage generator, or a voltage configurator external to the PMIC can be used and threshold values can be transmitted through a configuration terminal or connector.

Figure 2:
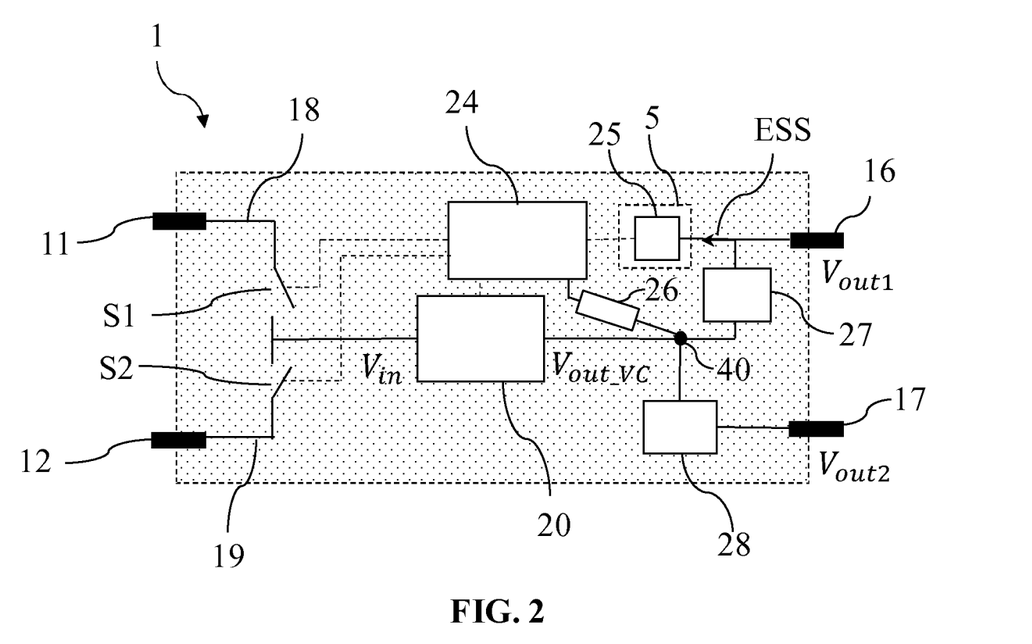
FIG. 2 shows an exemplary embodiment of a PMIC according to the invention.
Figure 3:
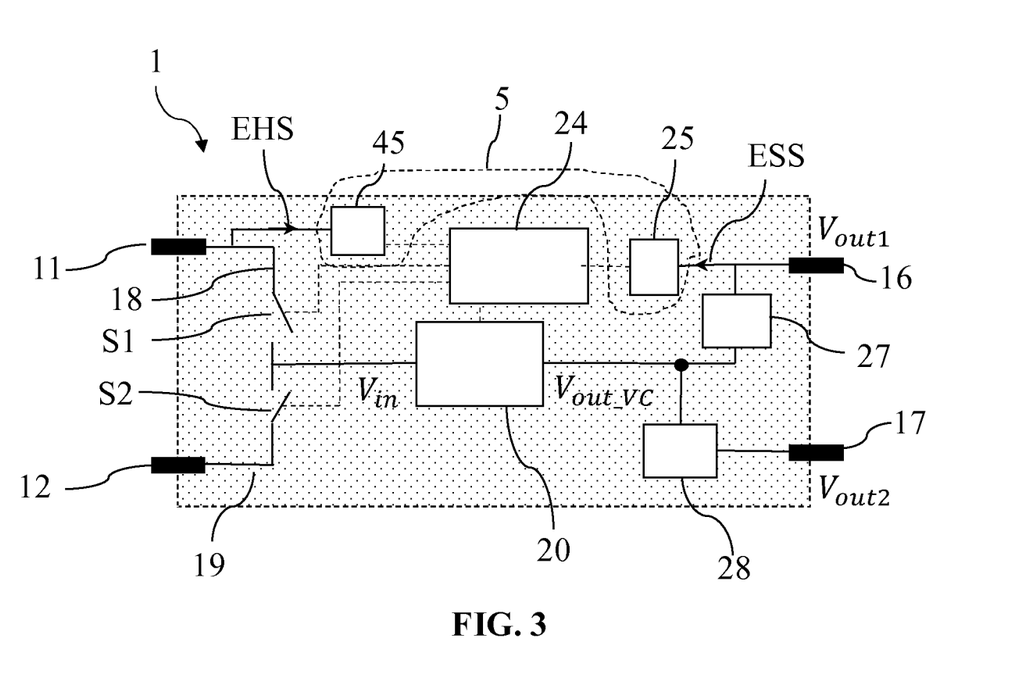
FIG. 3 shows a further exemplary embodiment of a PMIC according to the invention.

In embodiments, as shown on FIG. 2 and FIG. 3, the monitoring means 5 comprises an energy storage monitoring unit 25 coupled with the first output terminal 16 so as to monitor the energy storage device 50 when connected to the first output terminal 16. The energy storage signal ESS is indicative of the amount of energy stored in the energy storage device. The ESS signal is for example the voltage sensed at the first output terminal 16. The energy storage monitoring unit 25 comprises an energy storage level comparator for comparing the energy storage signal ESS with one or more predefined energy storage threshold values. A first predefined threshold value E1 is for example a threshold value that indicates that when the ESS signal is below this first predefined threshold value E1, the energy stored in the storage device is too low and that a switch to the primary battery operating state needs to be done in order to recharge the storage device. A second predefined threshold value E2 is for example a threshold value that indicates that when the ESS signal is above this threshold value, a switch needs to be made from the primary battery operating state to the normal operating state.

In embodiments, as for example shown on FIG. 3, the monitoring means 5 comprises, besides the energy storage monitoring unit 25, an energy harvester voltage sensor 45 that is coupled with the first input terminal 11 so as to monitor the energy harvester when connected to the first input terminal. The energy harvester voltage signal EHS is indicative of the availability of energy at the energy harvester. The energy harvester voltage sensor 45 comprises an energy harvester comparator for comparing the energy harvester voltage signal EHS with one or more predefined harvester threshold values. An example of such a predefined harvester threshold value is a first threshold value EH1 corresponding to a minimum value indication that no energy is available at the energy harvester if the EHS signal is below this first threshold value EH1.

Although the switching between the normal and primary battery operating states is triggered based on the signal ESS and/or the signal EHS, other pre-conditions might need to be fulfilled before the switching between the normal and primary battery operating states is effectively performed. This is the case for the exemplary embodiments shown on FIG. and FIG. 5 where the PMIC comprises a primary battery voltage sensor 35 configured for sensing a primary battery voltage signal PBS. The primary battery voltage sensor 35 comprises a battery level comparator for comparing said primary battery voltage signal PBS with one or more battery threshold levels. For example, a first battery threshold level can indicate that a primary battery is present at the second input terminal 12 if the PBS signal is equal or larger than this first battery threshold level. A second battery threshold level can indicate that a primary battery is not depleted if the PBS signal is equal or larger than this second battery threshold level.

The battery threshold levels can however be dependent on the type of primary battery. The PMIC either uses internal voltage reference values for specifying the battery threshold levels or the PMIC uses a multi-signal connector or one or more configuration terminals that allow to configure the battery threshold levels. The multi-signal connector or the one or more configuration terminals are coupled with the primary battery voltage sensor 35 for transmitting the battery threshold values from an external configuration device.

The external configuration device is for example a resistive divider outputting a fraction of a known reference voltage. In this way, one or more configuration voltage signals can be generated that corresponds to the required one or more battery voltage threshold values. Hence, depending on the battery type, the adequate voltage that indicates that the primary battery is depleted, can be externally defined.

In embodiments according to the invention where the voltage converter comprises a power point tracker, as discussed above, the power point tracker can be used as the monitoring means for monitoring the ESS and/or EHS signal and/or can also be used as a primary battery voltage sensor for monitoring the PBS signal. As known in the art, power point trackers are operable to compare an input voltage with a reference voltage and hence the circuit of the power point tracker can be used to perform the above-mentioned comparisons between threshold values and input signals being either ESS or EHS or PBS. In these embodiments, the controller is configured to alternate the monitoring of either the ESS, the EHS or the PBS signals using the sensor and comparator of the power point tracker as a single monitoring device.

For the embodiments comprising a primary battery voltage sensor 35, the switching between the normal and primary battery operating states can be further dependent on this PBS signal monitored with the primary battery voltage sensor 35.

Figure 8:
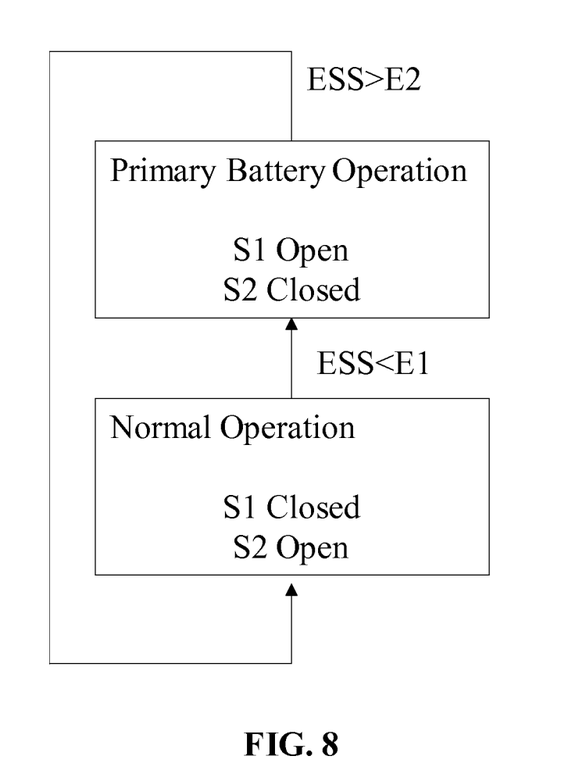
FIG. 8 is a schematic diagram illustrating the operational scheme of a PMIC according to the invention.

An example of an operational scheme of a PMIC according to the invention is shown in FIG. 8. When in the normal operating state, the switch S1 is closed and the switch S2 is open. When the energy storage status ESS is below a first predefined threshold value E1, a switch from the normal operating state to the primary battery operating state is made by opening the first switch S1 and closing the second switch S2. When in the primary battery operating state, the energy supplied by the voltage converter 20 to the storage device 50 comes from the primary battery. When the ESS signal becomes larger than a second pre-defined threshold value E2 or after a given predefined time period elapsed, or when the energy harvester voltage signal EHS is above a second threshold value EH2 indicating that energy is again available at the energy harvester, a switch to the normal operating state is made by closing the first switch S1 and opening the second switch S2. Only the first condition for switching back to the normal operation state is illustrated on FIG. 8. In embodiments, the first predefined threshold value EH1 can be equal to the second predefined threshold value EH2.

For the embodiments where the switch from the primary battery state to the normal operating state can be made after a predefined time period has elapsed, the controller 24 comprises a timer for tracking the time the PMIC is in the primary battery operating state.

In preferred embodiments, the switch from the primary battery operating state back to the normal operating state is also made if the primary battery voltage signal PBS is lower than the second battery threshold level, which corresponds to an indication that the primary battery is depleted. In this way, the PMIC is switched back in the normal operating state, even if the ESS signal is still below the E2 threshold.

For a PMIC comprising an energy harvester voltage sensor 45, the switching from the normal operating state to the primary battery operating state can alternatively be triggered when the energy harvester voltage signal EHS is indicating that no energy is available at the energy harvester, i.e. when the EHS signal is below the first predefined threshold value EH1. Also, switching back from the primary battery operating state to the normal operating state can with these embodiments be triggered when the energy harvester sensor detects that energy has become available at the energy harvester, i.e. when the EHS signal is above the second predefined threshold value EH2.

In embodiments, the energy storage monitoring unit 25 comprises circuitry configured as a voltage sensor such that E1 and E2 correspond to pre-defined voltage values related to the energy storage device 50. In other embodiments, the energy storage monitoring unit 25 comprises circuitry configured as a charge sensor such that E1 and E2 are pre-defined charge threshold values of the energy storage device 50.

Figure 4:
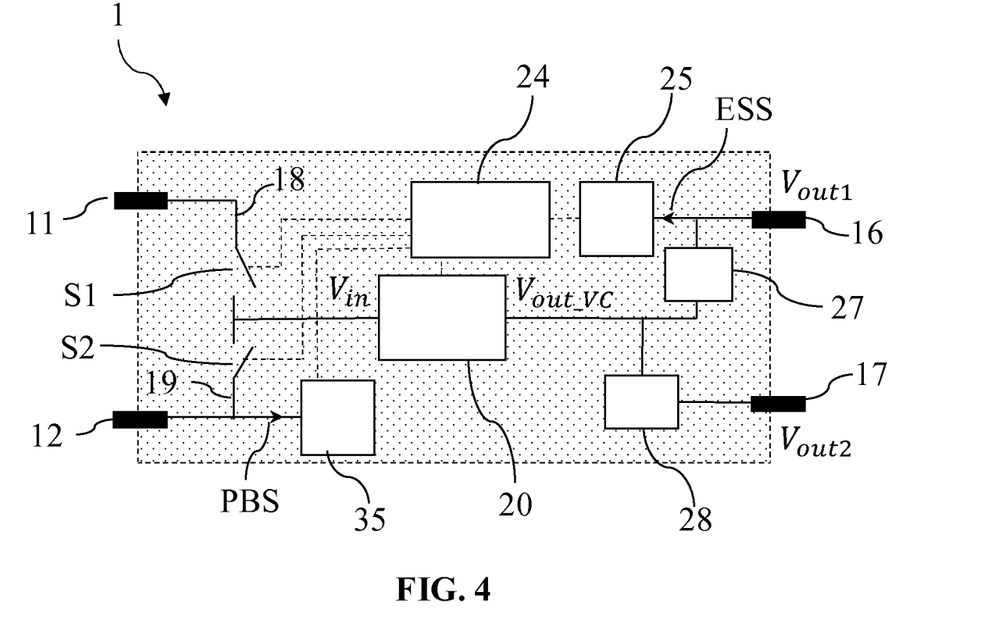
FIG. 4 shows a PMIC according to the invention comprising a primary battery voltage sensor.
Figure 5:
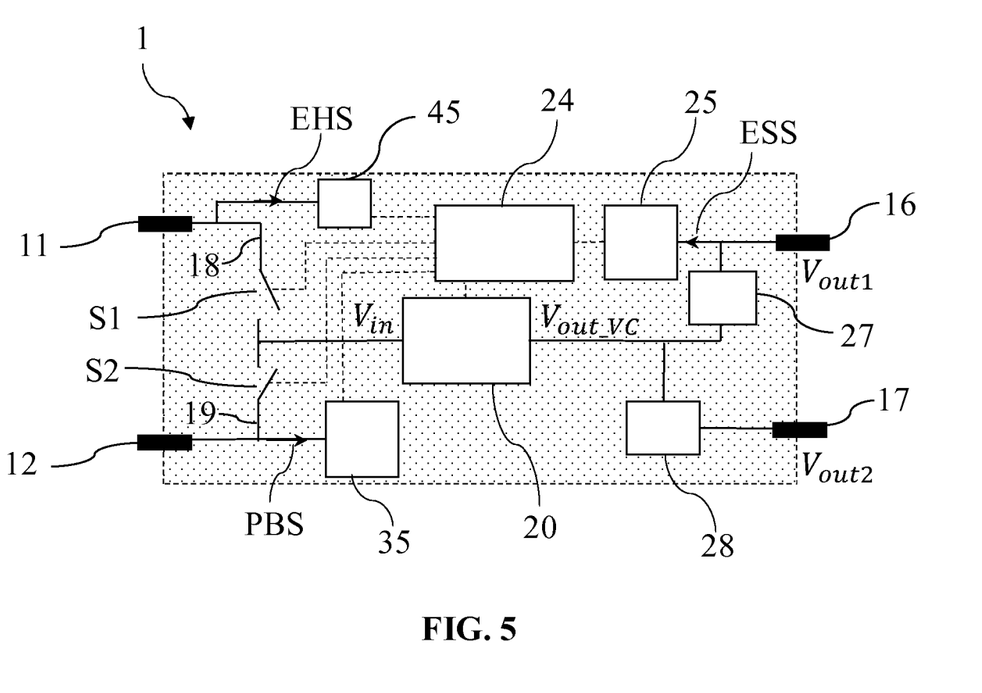
FIG. 5 shows a further embodiment of a PMIC according to the invention comprising a primary battery voltage sensor, FIG. 6 schematically illustrates an energy management system comprising a PMIC according to the invention, FIG. 7 schematically illustrates a further example of an energy management system according to the invention.
Figure 9:
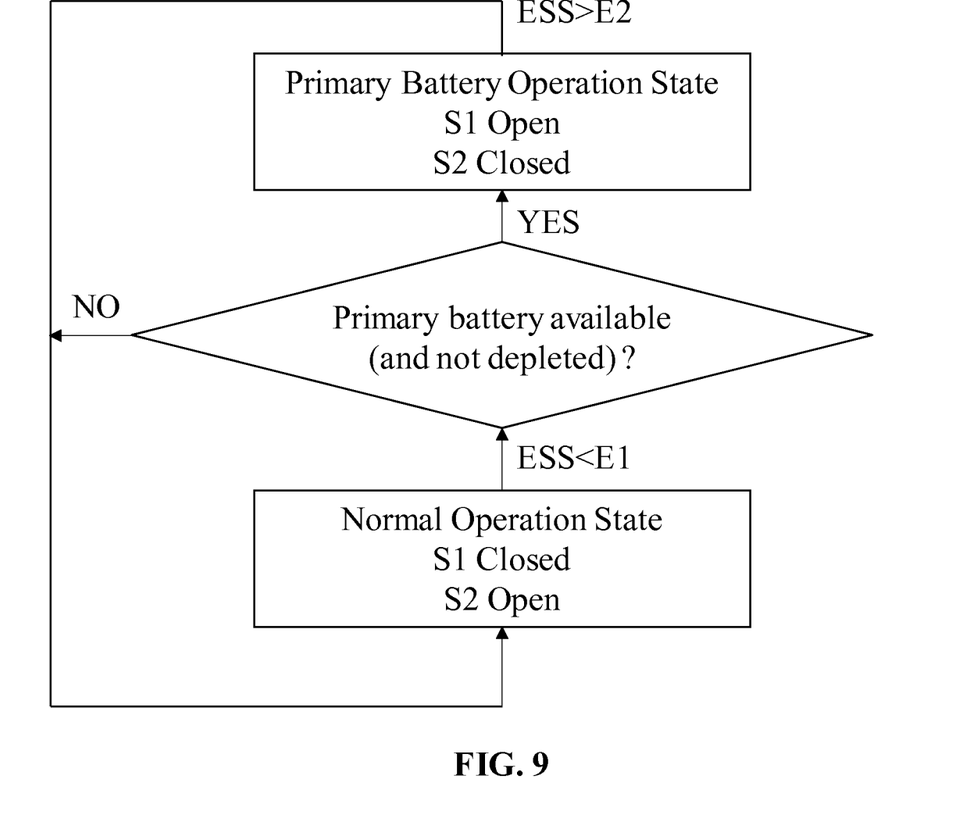
FIG. 9 is a schematic diagram illustrating an alternative operational scheme of the PMIC according to the invention.

For embodiments comprising a primary battery voltage sensor 35 as shown on FIG. 4 and FIG. 5, when in the normal operating state and when the energy storage signal ESS becomes lower than a given predefined threshold E1 the switching process to switch to the battery operating state is triggered but the switch is not performed yet. As a precondition, the primary battery voltage sensor 35 is enabled to detect if a primary battery is available or not and, optionally, if the available battery is not depleted. This operational scheme is schematically illustrated in FIG. 9. If the primary battery is available and, optionally, not depleted, the controller 24 launches the procedure to switch to the primary battery mode by opening switch S1 and closing the switch S2. If however the battery voltage sensor detects that no primary battery is available or, optionally, that it is depleted, the PMIC remains in the normal operating state by remaining the first switch S1 closed and the second switch S2 open.

Figure 10:
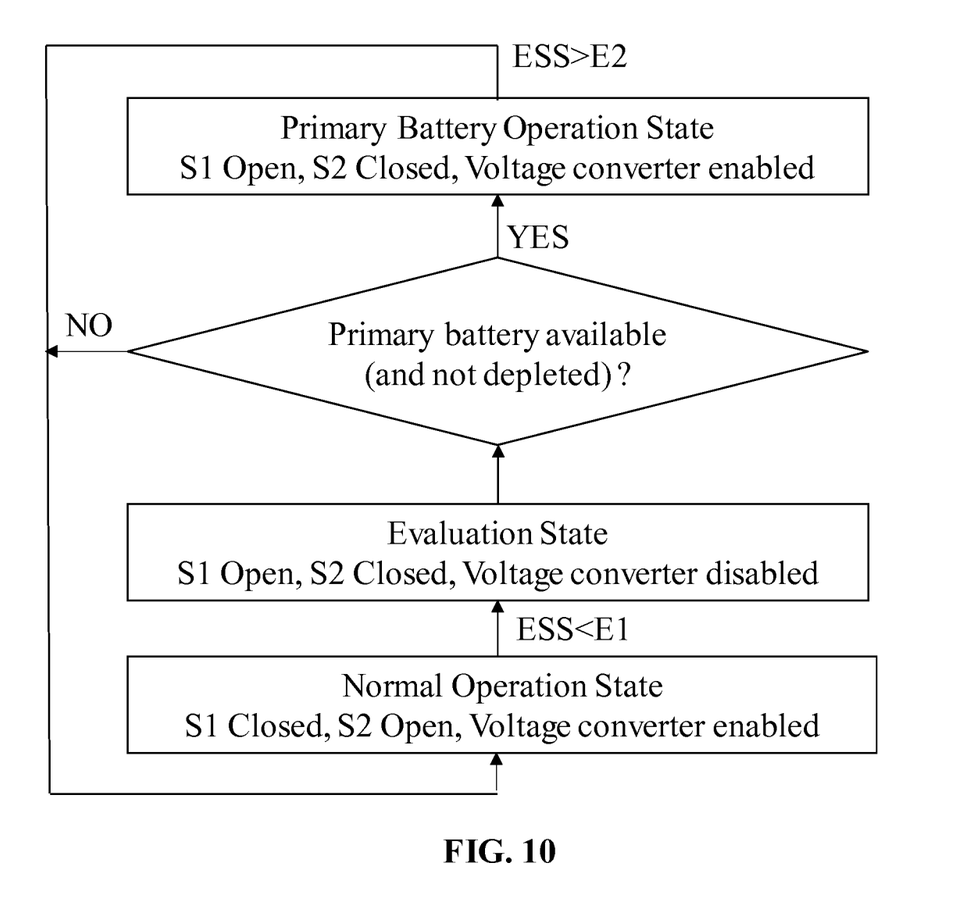
FIG. 10 is a schematic diagram illustrating an further alternative operational scheme of the PMIC according to the invention, FIG. 11 schematically illustrates an example of a voltage converter of a PMIC according to the invention, The figures are not drawn to scale. Generally, identical components are denoted by the same reference numerals in the figures.

The primary battery voltage sensor 35 can either be directly connected to the second PMIC input terminal 12 as shown on FIG. 4 or alternatively (not shown on the Figure) the primary battery voltage sensor 35 can be directly connected to the input of the voltage converter. In the latter case, the primary battery voltage sensor can only sense the PBS signal after the switch S2 is closed. For these embodiments, the PMIC has an intermediate evaluation state wherein the first switch S1 is open and the second switch S2 is closed and wherein the voltage converter is disabled, as illustrated on FIG. 10. During this intermediate evaluation state, the battery check, as discussed above, related to the presence of a primary battery is performed. If no primary battery is available or depleted, the PMIC switches back to the normal operation state by closing the first switch S1 and opening the second switch S2. If a primary battery is available and not depleted, the voltage converter is enabled and the energy storage device can receive power from the primary battery.

The primary battery to be used with the PMIC according to the invention has an open circuit voltage with a value that typically ranges between 0.5 and 10 Volt.

For embodiments where the PMIC comprises both an energy harvester voltage sensor 45 and a primary battery voltage sensor 35, these two sensors can be combined to form a single voltage sensor configured to sense both the EHS signal and the PBS signal.

One of the main advantages of the architecture of the PMIC according to the invention is that the primary battery is connected to the input of the voltage converter such that when in the primary battery operation state, the power output and the input/output voltages are regulated through the voltage converter the same way as when in the normal operation state where the energy harvester is used as input power. In prior art configurations, the primary battery is switched and connected on the level of the power output for the electrical application and hence this can result in sudden changes in output voltage $V_{out2}$ for the electrical application and in the prior art configurations, as discussed above, only specific primary batteries can be used that fulfil the requirements of the application load and/or the storage device. As discussed above, the voltage converter can for example comprise a DC-DC boost converter circuit, a buck converter circuit or a buck-boost converter circuit, known in the art.

Figure 11:
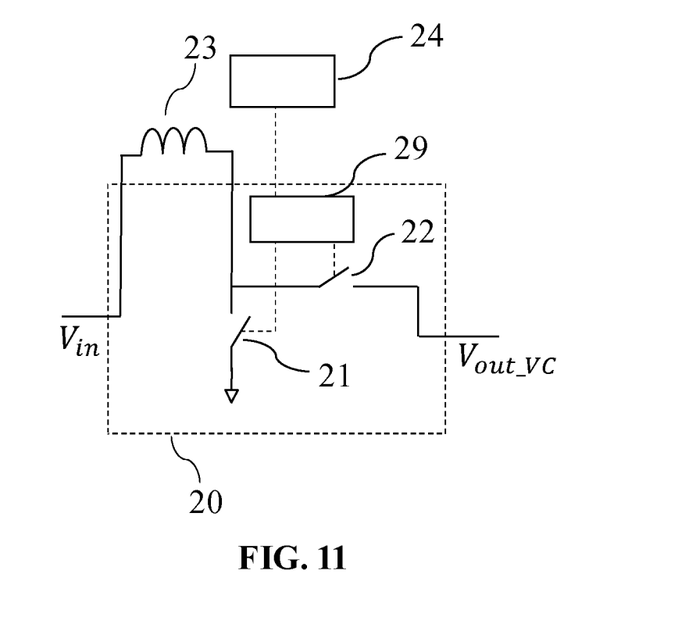

An exemplary voltage converter 20 comprising a boost converter circuit is schematically illustrated on FIG. 11. The boost converter circuit comprises a first 21 and second 22 voltage converter switch that are controlled by a voltage converter controller 29. The voltage converter 20 makes use of an inductor 23. In embodiments, the voltage converter controller 29 can be part of the controller 24. As known in the art, by cyclically controlling the first and second switch, magnetic energy stored in the inductor 23 is cyclically transferred to the load connected to the voltage converter output that is a higher voltage $V_{out\_VC}$ than the voltage $V_{in}$ at the converter input. In some embodiments, as illustrated on FIG. 7, the inductor 23 is located outside the PMIC. In these examples shown, the inductor 23 is coupled to the PMIC through a first inductor terminal 14 and a second inductor terminal 9. In some embodiments, when the voltage converter is a boost converter, the buffer capacitor terminal 8 discussed above can be merged with the first inductor terminal 14.

As mentioned above, some embodiments of the voltage converter 20 also comprise a power point tracker (PPT) that allows to track an optimum operational voltage to extract power from the energy harvester. Generally, the optimum voltage is a voltage that is optimum for extracting maximum power from the energy harvester.

Power point trackers for use with PMIC's for energy harvesting are known in the art. The optimum voltage is determined by the power point tracker by sensing a voltage at the input of the power point tracker and taking a fraction, e.g. 90%, 80%, 50% or 100%, of this voltage as an optimum operational voltage value.

The power point tracking is generally based on an open circuit voltage evaluation of the energy harvester. Therefore, the voltage converter is configured such that the voltage at the input of the power point tracker corresponds to the open circuit voltage of the energy harvester. For example when a PV cell is used as an energy harvester, the power point tracker obtains the optimum operational voltage for the PV cell by taking an 80% fraction of the open circuit voltage of the PV cell as sensed at the input of the power point tracker.

When the PMIC is operating in the primary battery operating state, the power point tracker can also be used but the fraction that is used by the power point tracker is generally different. In the primary battery operating state, the power point tracker will sense the open circuit voltage of the primary battery and the power point tracker will then take a fraction of for example 90% of this open circuit voltage for obtaining the optimum operating voltage.

Therefore, in embodiments where the voltage converter comprises a power point tracker, the power point tracker is configured for using a different fraction when in the primary battery operating state than when in the normal operating state. The fraction to be used in the primary battery operating state and in the normal operating state can be pre-defined reference values associated to the voltage converter, or the values can be configured by a configuration signal or bus signal the voltage converter can receive through a dedicated configuration terminal for specifying the fractions.

When in the normal operating state, i.e. when energy is extracted from the energy harvester, the input voltage at the voltage converter $V_{in}$ is regulated by taking as target value the optimum operational voltage, determined by the PPT during the energy harvester open circuit voltage evaluation. Similar, when in the primary battery operating state, i.e. when energy is extracted from the primary battery, the input voltage at the voltage converter $V_{in}$ is regulated by taking as target value the optimum operational voltage, determined by the PPT during the primary battery open circuit voltage evaluation.

Advantageously, as discussed above, for PMIC embodiments comprising a voltage converter with a power point tracker, the power point tracker can also be used as the primary battery voltage sensor 35 to provide the PBS signal indicating the presence or no presence of a primary battery and indicating if the primary battery is depleted or not.

Figure 1B:
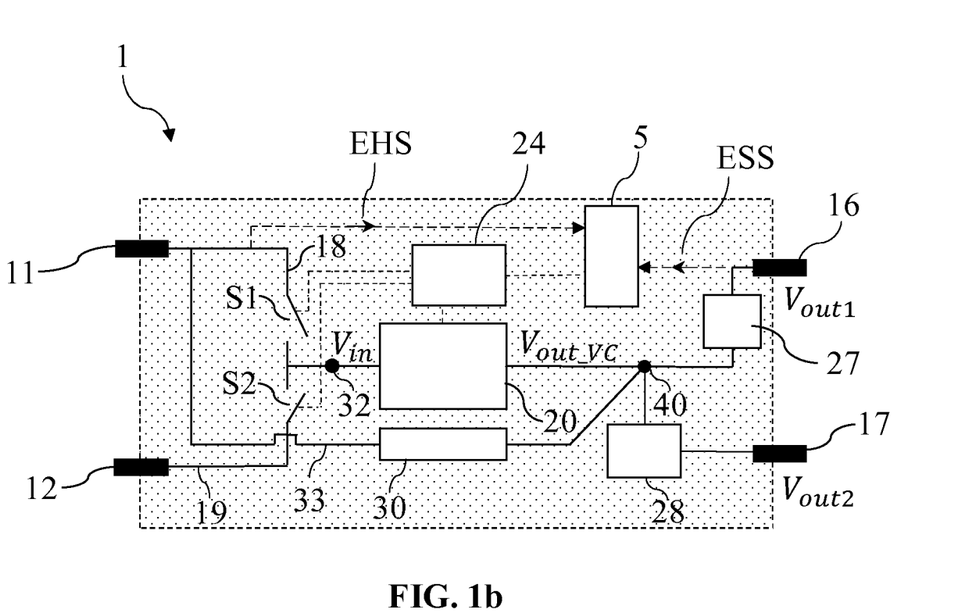
FIG. 1b schematically illustrates an embodiment of the invention comprising a cold-start module, FIG. 1c schematically illustrates another embodiment according to the invention comprising a cold-start module, FIG. 1d schematically illustrates a further embodiment of a PMIC according to the invention.
Figure 1C:
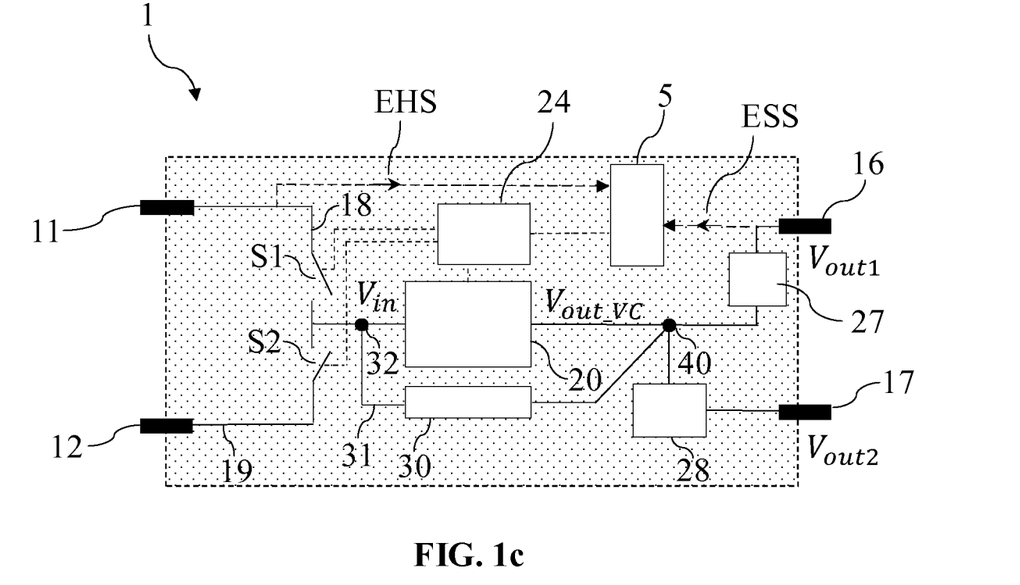
Figure 1D:
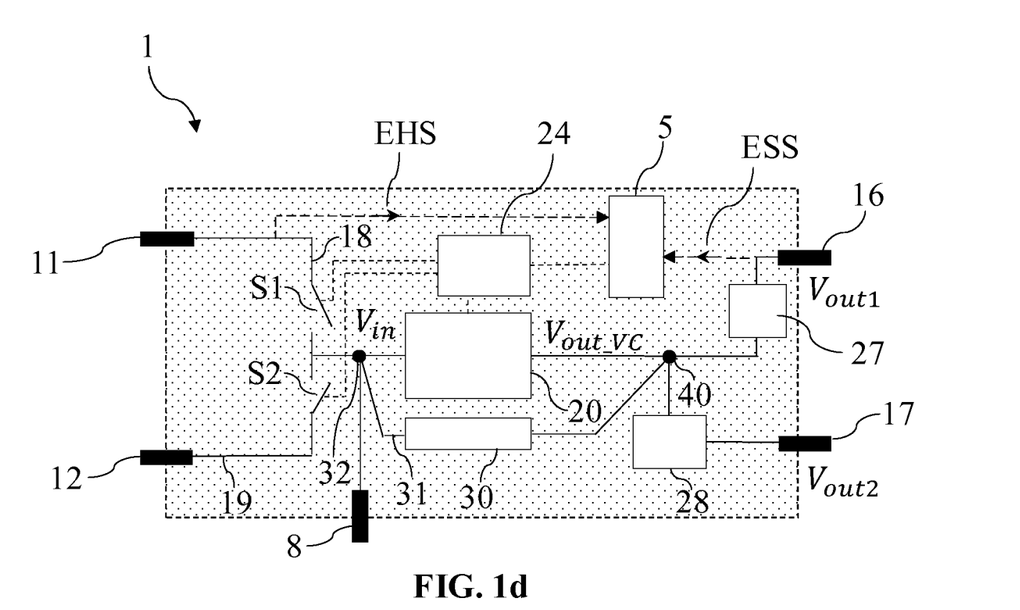
Figure 7:
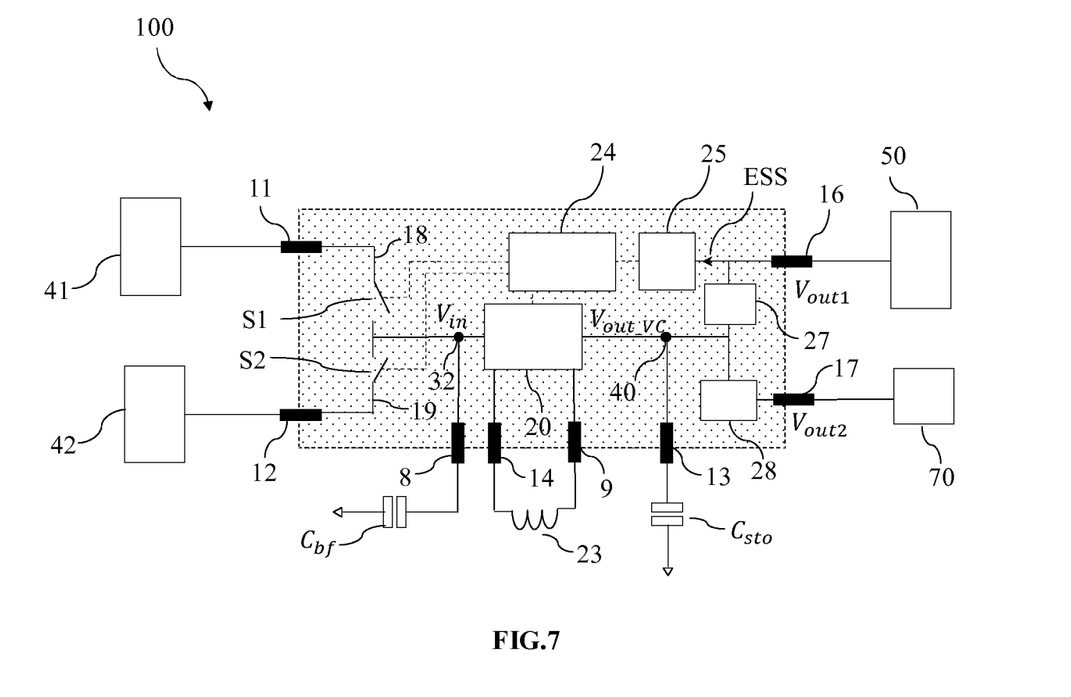

In embodiments, as also illustrated on FIG. 1d and FIG. 7, the PMIC comprises a buffer capacitor terminal 8 which is conductively connected with an input node 32 of the voltage converter 20. The buffer capacitor terminal 8 allows to optionally connect an external buffer capacitor $C_{bf}$, as shown on FIG. 7. The buffer capacitor $C_{bf}$ is charged during the transfer of energy from the energy harvester to the storage device or during the transfer of energy from the primary battery to the storage device. This buffer capacitor avoids that the input node collapses when the inductor of the voltage converter 20 is building-up current. In embodiments not comprising a buffer capacitor terminal 8, a buffer capacitor $C_{bf}$ can be connected to the first input terminal 11.

As discussed above in the introduction part, the PMIC's known in the art generally comprise a cold-start module 30 configured for starting-up the PMIC. In the embodiments comprising a cold-start module, the controller 24 is configured for enabling operation of the cold-start module 30 and disabling operation of the voltage converter 20 if the output voltage $V_{out\_VC}$ at the output 40 is lower than a minimum operational threshold voltage $V_{out\_VC-min}$. The controller 24 is further configured for enabling operation of the voltage converter 20 and for disabling operation of the cold-start module 30 if the output voltage $V_{out\_VC}$ at the output 40 is equal or above the minimum operational threshold voltage $V_{out\_VC-min}$. The voltage value $V_{out\_VC-min}$ is to be construed as a reference value, for example an internal reference value of the PMIC.

A number of examples of embodiments of PMIC's comprising a cold-start module are schematically illustrated on FIG. 1b, FIG. 1c and FIG. 1d. The cold-start module is generally coupled between the input node 32 and the output node 40 of the voltage converter. In this way, when in operation, the cold-start module transfers power from the input node to the output node and the voltage at the output node 40 is increased.

During the start-up of the PMIC with the cold-start module, the second switch S2 remains open, thereby disabling any current flow in the conducting path 19 connecting the second terminal 12 to the input of the voltage converter 20. Hence, a primary battery connected to the second input terminal 12 can only be used in combination with the operation of the voltage converter 20 and hence is not used in combination with the cold-start module. In other words, the second switch S2 and the controller 24 are configured for maintaining the second switch 24 open during operation of the cold-start module 30. In embodiments, the first switch S1, the second switch S2 and the controller 24 are configured for maintaining the first switch S1 closed and for maintaining the second switch S2 open during operation of the cold-start module 30.

In embodiments, as schematically illustrated on FIG. 1b, the cold-start module 30 is coupled between the first input terminal 11 and the output 40 of the voltage converter 20. In these embodiments, a conducting path 33 is conductively connecting the input terminal 11 with an input of the cold-start module.

In other embodiments, as schematically illustrated in FIG. 1c, a conducting path 31 is conductively connecting the input node 32 of the voltage converter 20 with the input of the cold-start module 30.

In further PMIC embodiments comprising a cold-start module, the PMIC also comprises a buffer capacitor terminal 8 as discussed above. Such an embodiment is schematically illustrated in FIG. 1d. Besides the conducting path 31 conductively connecting the input node 32 of the voltage converter 20 with the input of the cold-start module 30, the input node 32 is also conductively connected with the buffer capacitor terminal 8. In these embodiments, during the start-up with the cold-start module, switch S1 is closed and switch S2 is open.

Remark that the cold-start module is advantageously used when the energy storage device is a capacitor or a supercapacitor. Indeed, because a capacitor or super capacitor is initially empty, i.e. with a 0 voltage between positive and negative connectors, the cold-start module will charge the capacitor or supercapacitor until the minimum operational threshold voltage $V_{out\_VC-min}$ is reached.

As known in the art and schematically illustrated on FIG. 2, a third connecting circuit 26 is conductively coupling the output 40 of the voltage converter 20 with the controller 24 and/or the voltage converter 20 for supplying electrical power for operating the controller 24 and/or voltage converter 20. Indeed, the PMIC has no proper power source and the controller and/or voltage converter have to acquire power via the output 40 that is at the voltage $V_{out\_VC}$.

The third connecting circuit 26 coupling the output 40 and the controller and/or voltage converter can be a direct coupling in which case the third connecting circuit 26 corresponds to a conductor.

In other embodiments, the third connecting circuit 26 comprises additional components for making a coupling between the output 40 and the controller 24 and/or the voltage converter 20. An example of such an additional component is a DC-DC converter allowing to for example reduce the voltage $V_{out\_VC}$ at output 40 and provide a required operational voltage for the controller and/or voltage converter.

In FIG. 6 an energy harvesting system 100 comprising a power management integrated circuit 1 according to the invention is shown. An energy harvester 41 is connected to the first input terminal 11 and an energy storage device 50, such as a rechargeable battery or a capacitor, is connected to the first output terminal 16. Several types of rechargeable batteries that can be used as a rechargeable battery for the energy harvesting system exist on the market such as for example Li-ion batteries or NiCd batteries. An example of an energy harvester 41 is a photovoltaic cell (PV) or a thermoelectric generator (TEG). A primary battery 42 is connected to the second input terminal 12. A primary battery is a battery that is generally designed to be used once and generally cannot be recharged. Examples of primary batteries are alkaline batteries or zinc-carbon batteries.

In FIG. 7, a further example of an energy harvesting system is shown wherein the PMIC further comprises a storage capacitor terminal 13 and a storage capacitor $C_{sto}$ connected to the storage capacitor terminal 13. The storage capacitor terminal 13 is conductively connected with the output 40 of voltage converter and hence the voltage $V_{out\_VC}$ at the output of the voltage converter corresponds to the voltage at the storage capacitor $C_{sto}$ connected to the storage capacitor terminal.

According to a second aspect of the invention, a method for managing a transfer of electrical power from an energy harvester to an energy storage device using a power management integrated circuit PMIC comprising a voltage converter is provided. The method comprising steps of
coupling the energy harvester with an input of said voltage converter of the PMIC,
coupling the energy storage device with an output of said voltage converter,
monitoring an energy storage signal (ESS) indicative of an amount of energy stored in the energy storage device,
optionally monitoring a harvester voltage signal (EHS) indicating if energy is available or not at the energy harvester,
if the energy storage signal (ESS) is lower than a first pre-defined threshold value E1 or optionally if no energy available at the energy harvester, decoupling the energy harvester from the input of the voltage converter and instead coupling a primary battery to the input of said voltage converter,
if the energy storage signal (ESS) is above a second threshold value E2 or after a given time period has elapsed after connecting the primary battery or optionally if energy is available at the energy harvester, decoupling the primary battery from the input of the voltage connector and instead coupling the energy harvester to the input of the voltage converter.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. Use of the verb "to comprise", as well as the respective conjugations, does not exclude the presence of elements other than those stated. Use of the article "a", "an" or "the" preceding an element does not exclude the presence of a plurality of such elements.

When the word "connecting" or "connected" has been used, it has to be construed as a conductive connection that is either a direct connection using for example a conductor or an indirect connection where other components, such as for example a voltage converter or additional connectors or circuits, are used to establish the connection.

The invention claimed is:

1. A power management integrated circuit for managing energy from an energy harvester, said power management integrated circuit comprising:
a voltage converter that converts an input voltage ($V_{in}$) into an output voltage ($V_{out\_VC}$);
a first input terminal connectable with the energy harvester to receive a first input power;
a first conducting path that transfers said first input power from said first input terminal to an input of said voltage converter;
a first output terminal connectable with an energy storage device;
a first connecting circuit that connects an output of the voltage converter with the first output terminal;
wherein the power management integrated circuit further comprises:
a second input terminal connectable with a primary battery to receive a second input power;
a second conducting path that transfers said second input power from said second input terminal to said input of said voltage converter;
a first switch configured to enable or disable current flow in said first conducting path by respectively closing or opening the first switch;
a second switch configured to enable or disable current flow in said second conducting path by respectively closing or opening the second switch;
a monitoring means that monitors at least one of an energy storage signal (ESS) at the first output terminal or that monitors an energy harvesting signal (EHS) at the first input terminal;
a controller that controls said first switch and said second switch, and wherein said controller is coupled with said monitoring means and is configured to switch between a normal operating state wherein the first switch is closed and the second switch is open and a primary battery operating state wherein the first switch is open and the second switch is closed; and
wherein said switching between said normal operating state and said primary battery operating state is triggered based on at least one of said energy storage signal (ESS) or said energy harvesting signal (EHS); and
wherein said monitoring means comprises at least one of:
an energy storage monitoring unit coupled with the first output terminal for receiving said energy storage signal (ESS), and wherein said energy storage monitoring unit comprises an energy storage level comparator that compares said energy storage signal (ESS) with one or more predefined energy storage threshold values; or
an energy harvester voltage sensor coupled with the first input terminal, wherein said energy harvester voltage sensor comprises an energy harvester comparator that compares said energy harvester voltage signal (EHS) with one or more predefined harvester threshold values.

2. The power management integrated circuit according to claim 1 wherein the controller is configured to trigger the switching from said normal operating state to said primary battery operating state when at least one of:
said energy storage signal (ESS) is below a first predefined threshold value E1, or
said energy harvester voltage signal (EHS) is below a first predefined threshold value EH1.

3. The power management integrated circuit according to claim 1 further comprising a primary battery voltage sensor configured for sensing a primary battery voltage signal (PBS) at the second PMIC input terminal; and
wherein said primary battery voltage sensor comprises a battery level comparator that compares said primary battery voltage signal (PBS) with one or more battery threshold levels.

4. The power management integrated circuit according to claim 3, further comprising a multi-signal connector or one or more primary battery configuration terminals coupled with said primary battery voltage sensor that transmits said one or more battery threshold values from an external configuration device.

5. The power management integrated circuit according to claim 3 wherein the controller is configured to switch from said normal operating state to said primary battery operating state on condition that at least one of:
   the primary battery voltage signal (PBS) is equal or above a first battery threshold level indicating that a primary battery is present, or
   that the primary battery voltage signal (PBS) is equal or above a second battery threshold level indicating that a primary battery is not depleted.

6. The power management integrated circuit according to claim 1 wherein said controller is configured to switch from said primary battery operating state to said normal operating state when said energy storage signal (ESS) is above a second predefined threshold value E2 or when a predefined time period has elapsed while in the primary battery operating state or when said energy harvester voltage signal (EHS) is above a second predefined threshold value EH2.

7. The power management integrated circuit according to claim 1 wherein said energy storage monitoring unit further comprises:
   circuitry configured as a voltage sensor and wherein said pre-defined threshold value E1 and pre-defined threshold value E2 correspond to predefined voltage values, or
   circuitry configured as a charge counter and wherein at least one of said pre-defined threshold value E1 and predefined threshold value E2 correspond to predefined charge values.

8. The power management integrated circuit according to claim 1 further comprising:
   a second output terminal connectable with an application load; and
   a second connecting circuit configured to couple the second output terminal with at least one of the output of the voltage converter or with the first output terminal; and
   wherein said second connecting circuit comprises a voltage regulator that supplies a voltage $V_{out2}$ at the second output terminal.

9. The power management integrated circuit according to claim 8 further comprising a third connecting circuit that conductively couples at least one of: the output of the voltage converter with the controller, or the voltage converter that supplies electrical power for operating the controller, or the voltage converter.

10. The power management integrated circuit according to claim 1 wherein said voltage converter comprises a power point tracker that determines an optimum operational voltage for extracting energy from the energy harvester by taking a fraction of a voltage sensed at an input of the power point tracker as said optimum operational voltage; and
    wherein said power point tracker is operable for using a different value for said fraction when in said primary battery operating state than when in said normal operating state.

11. The power management integrated circuit according to claim 1 further comprising a storage capacitor terminal connectable with a storage capacitor ($C_{sto}$); and
    wherein said storage capacitor terminal is conductively connected with said output of voltage converter.

12. An energy harvesting system comprising:
    a power management integrated circuit according to claim 1;
    an energy harvester connected to said first input terminal;
    an energy storage device comprising a rechargeable battery or a capacitor or a supercapacitor, connected to said first output terminal; and
    a primary battery connected to said second input terminal.

13. The energy harvesting system according to claim 12 wherein said energy harvester provides an input power having a value between 1 microwatt and 1 Watt and an input voltage at the first input terminal between 0.05 V and 100 V;
    wherein said primary battery has an open circuit voltage value between 0.5 V and 10 V; and
    wherein the voltage at the first output terminal has a maximum value between 2 V and 10 V.

14. The energy harvesting system according to claim 12 wherein said power management integrated circuit further comprises:
    a second output terminal connectable with an application load; and
    a second connecting circuit configured to couple the second output terminal with at least one of the output of the voltage converter or with the first output terminal.

15. A method for managing a transfer of electrical power from an energy harvester to an energy storage device using the power management integrated circuit of claim 1, the method comprising the steps of:
    coupling the energy harvester with an input of said voltage converter;
    coupling the energy storage device with an output of said voltage converter;
    monitoring an energy storage signal (ESS) indicative of an amount of energy stored in the energy storage device;
    monitoring a harvester voltage signal (EHS) indicating if energy is available or not at the energy harvester;
    wherein if the energy storage signal (ESS) is lower than a first pre-defined threshold value E1 or if no energy is available at the energy harvester, decoupling the energy harvester from the input of the voltage converter and instead coupling a primary battery to the input of said voltage converter; and
    wherein if the energy storage signal (ESS) is above a second threshold value E2 or after a given time period has elapsed after connecting the primary battery or if energy is available at the energy harvester, decoupling the primary battery from the input of the voltage connector and instead coupling the energy harvester to the input of the voltage converter.

16. A power management integrated circuit for managing energy from an energy harvester, said power management integrated circuit comprising:
    a voltage converter that converts an input voltage ($V_{in}$) into an output voltage ($V_{out\ VC}$);
    a first input terminal connectable with the energy harvester to receive a first input power;
    a first conducting path that transfers said first input power from said first input terminal to an input of said voltage converter;
    a first output terminal connectable with an energy storage device;
    a first connecting circuit that connects an output of the voltage converter with the first output terminal;
    wherein the power management integrated circuit further comprises:

a second input terminal connectable with a primary battery to receive a second input power;
a second conducting path that transfers said second input power from said second input terminal to said input of said voltage converter;
a first switch configured to enable or disable current flow in said first conducting path by respectively closing or opening the first switch;
a second switch configured to enable or disable current flow in said second conducting path by respectively closing or opening the second switch;
a monitoring means that monitors at least one of an energy storage signal (ESS) at the first output terminal or that monitors an energy harvesting signal (EHS) at the first input terminal;
a controller that controls said first switch and said second switch, and wherein said controller is coupled with said monitoring means and is configured to switch between a normal operating state wherein the first switch is closed and the second switch is open and a primary battery operating state wherein the first switch is open and the second switch is closed, where said switching between said normal operating state and said primary battery operating state is triggered based on at least one of said energy storage signal (ESS) or said energy harvesting signal (EHS); and
a cold-start module configured to start-up the power management integrated circuit, and wherein said controller is further configured to:
  a) enable operation of said cold-start module and disable operation of said voltage converter if said output voltage ($V_{out\_VC}$) at said output of the voltage converter is lower than a minimum operational threshold voltage $V_{out\_VC-min}$; and
  b) disable operation of said cold-start module and enable operation of said voltage converter if said output voltage ($V_{out\_VC}$) at said output of the voltage converter is equal or above said minimum operational threshold voltage $V_{out\_VC-min}$.

17. The power management integrated circuit according to claim 16 wherein said second switch and said controller are configured to maintain said second switch open during operation of said cold-start module.

18. The power management integrated circuit according to claim 16 wherein said first switch, said second switch and said controller are configured to maintain said first switch closed and to maintain said second switch open during operation of said cold-start module.

19. The power management integrated circuit according to claim 16 wherein said cold-start module is coupled between said input and said output of said voltage converter.

* * * * *